United States Patent
Hashimoto et al.

(10) Patent No.: US 6,915,192 B2
(45) Date of Patent: Jul. 5, 2005

(54) VEHICULAR ELECTRONIC CONTROL APPARATUS

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/635,601

(22) Filed: Aug. 7, 2003

(65) Prior Publication Data

US 2004/0143695 A1 Jul. 22, 2004

(30) Foreign Application Priority Data

Jan. 17, 2003 (JP) .................................. P2003-009957

(51) Int. Cl.⁷ .............................................. G06F 19/00
(52) U.S. Cl. ............................ 701/35; 701/29; 701/115
(58) Field of Search ............................. 701/29, 35, 39, 701/43, 62, 76, 92, 97, 107, 115; 340/438, 439

(56) References Cited

U.S. PATENT DOCUMENTS

| | | | | |
|---|---|---|---|---|
| 4,943,924 A | * | 7/1990 | Kanegae et al. | ............ 701/115 |
| 5,247,446 A | * | 9/1993 | Motz et al. | ................ 701/115 |
| 5,668,726 A | * | 9/1997 | Kondo et al. | ................ 701/115 |
| 6,216,084 B1 | * | 4/2001 | Uematsu et al. | ............ 701/114 |

FOREIGN PATENT DOCUMENTS

| | | |
|---|---|---|
| JP | 8-121238 A | 5/1996 |
| JP | 8-153397 A | 6/1996 |
| JP | 8-177608 A | 7/1996 |
| JP | 10-252547 A | 9/1998 |
| JP | 11-132097 A | 5/1999 |
| JP | 2000-185606 A | 7/2000 |
| JP | 2000-257502 A | 9/2000 |
| JP | 2001-182607 A | 7/2001 |
| JP | 2001-227402 A | 8/2001 |

* cited by examiner

Primary Examiner—Gary Chin
(74) Attorney, Agent, or Firm—Sughrue Mion, PLLC

(57) ABSTRACT

A vehicular electronic control apparatus is provided with a program memory, a data memory, a RAM, a microprocesser, a reference data storage memory, a data memory abnormality judging section, and at least two transfer sections for a RAM. The reference data storage memory stores reference data corresponding to variable control data stored in the data memory. The data memory abnormality judging section judges whether the variable control data stored in the data memory are normal or abnormal. The first transfer section transfers and writes the variable control data from the data memory to the RAM. The second transfer section writes estimated variable control data based on the reference data from the reference data storage memory to the RAM.

20 Claims, 4 Drawing Sheets

VEHICULAR ELECTRONIC CONTROL APPARATUS

BACKGROUND OF THE INVENTION

1. Field of the Invention

The present invention relates to a vehicular electronic control apparatus for performing, for example, a fuel supply control on an automobile engine and an opening/closing control on an intake throttle valve. In particular, the invention relates to an improved vehicular electronic control apparatus that enables a data-replaced drive at the occurrence of an abnormality in a nonvolatile data memory that cooperates with a microprocessor and to which several kind of variable control data are written.

2. Description of the Related Art

A vehicular electronic control apparatus is known that is provided with a nonvolatile program memory to which control programs, control constants, etc. for a vehicle type to be controlled are written from an external tool, a nonvolatile data memory to which variable control data are written, a RAM for arithmetic processing, and a microprocessor connected to the program memory, the data memory, and the RAM, and that controls vehicular electric loads in accordance with input signals from vehicular sensors and the contents of the program memory and the data memory. In such a vehicular electronic control apparatus, a technique that a nonvolatile data memory such as an EEPROM on which writing can easily performed electrically is utilized as the above-mentioned data memory and various learning data, vehicle-specific data, analysis/maintenance data, etc. are written to the data memory and used as effective drive control data and diagnosis data for an external tool is put in practice use widely.

JP-A-2001-182607 and JP-A-10252547 each entitled "Vehicular Control Apparatus" disclose improved measures against a risk that the power switch may be turned of f accidentally while learning data for correcting control parameters and a control theory by evaluating past control results to eliminate influences of aging variations of a control subject, differences between individual subjects, etc. are being written, for storage, from a RAM to an EEPROM to accommodate a shutoff in the battery lines and an abnormal decrease in the battery voltage.

JP-A-2000-185606 entitled "Vehicular Electronic Control Unit and its Exchange Method" discloses a technique that a VIN code (vehicle-specific data) number is written in advance to a nonvolatile data memory such as an EEPROM, whereby the efficiency of work in exchanging or attaching a vehicular electronic control unit due to occurrence of a problem, for example, is increased.

JP-A-8-121238 entitled "Vehicular Information Storing Apparatus" discloses a means for extracting and storing, every predetermined period, necessary data to write, for storage, long-term analysis/maintenance data to an EEPROM.

JP-A-2000-257502 entitled "Automobile Electronic Control Apparatus," which is more relevant to the present invention, discloses a technique that the power of an electronic control apparatus is turned off with a delay after a stop of driving of a vehicle (i.e., turning-off of the power switch) and data of a RAM are written divisionally as appropriate to an EEPROM that serves as one or both of a flash memory (program memory) and a data memory while the electronic control apparatus is turned off.

JP-A-2001-227402 entitled "Vehicular Electronic Control Apparatus," discloses a technique of performing checksum on a program memory while reducing the load of a microprocessor.

Each of the above related art references relates to utilization of a nonvolatile data memory such as an EEPROM and improvement in a method and timing of writing storage data to the data memory in a vehicular electronic control apparatus, and does not refer to how to handle the data stored in the nonvolatile data memory should an abnormality occur in the data.

If the data stored in the nonvolatile data memory are merely past history information and their contents do not influence a present or future drive control, there does not occur any safety-related problem. However, a safety-related problem may arise if control variable data that influence the operation of a microprocessor are stored in the nonvolatile data memory.

SUMMARY OF THE INVENTION

The present invention has been made to solve the above problem, and an object of the invention is therefore to provide a vehicular electronic control apparatus that can increase the safety of vehicle controls by performing an abnormality diagnosis on a nonvolatile data memory and taking a proper measure at the occurrence of an abnormality and that can effectively utilize the nonvolatile data memory and increase the range of its utilization.

A vehicular electronic control apparatus according to one aspect of the invention which includes a nonvolatile program memory in which at least a control program suitable for a vehicle to be controlled is stored, a nonvolatile data memory in which at least variable control data are stored, a RAM for arithmetic processing, and a microprocesser connected to the nonvolatile program memory, the nonvolatile data memory and the RAM. The vehicular electronic control apparatus controls vehicle electric loads on the basis of input signals from vehicle sensors, the control program stored in the nonvolatile program memory, and the variable control data stored in the nonvolatile data memory.

The vehicular electronic control apparatus further includes a reference data storage memory, data memory abnormality judgement means for the nonvolatile data memory, and a first and second transfer means for the RAM.

The reference data storage memory is an electrically writable nonvolatile memory in which reference data corresponding to the variably control data stored in the nonvolatile data memory are stored. The data memory abnormality judging means is constructed to judge whether the variable control data stored in the nonvolatile data memory are normal or abnormal. The first transfer means is means for transferring and writing the variable control data from the nonvolatile data memory to the RAM if the data memory abnormality judging means judges that the variable control data stored in the nonvolatile data memory are normal. The second transfer means is means for writing estimated variable control data based on the reference data from the reference data storage memory to the RAM if the data memory abnormality judging means judges that the variable control data stored in the nonvolatile data memory are abnormal. The microprocessor controls the vehicle electric loads on the basis of one of the variable control data and the estimated variable control data that have been written to the RAM.

This configuration enables a drive of a vehicle by using estimated variable control data that have been written to the RAM even in the case where an abnormality is found in the data memory. Further, variable control data that are important for the safety and vehicle performance can also be stored in the nonvolatile data memory on which rewriting can be performed easily. A more effective vehicle control can be performed by using corrected variable control data by overwriting the data stored in the data memory with variable control data in the RAM that have been corrected and rewritten by the microprocessor.

A vehicular electronic control apparatus according to another aspect of the invention which includes a nonvolatile program memory in which at least a control program suitable for a vehicle to be controlled is stored, a nonvolatile data memory in which at least variable control data are stored, the nonvolatile data memory including first and second data memories in which at least parts of the variable control data are stored in a duplicated manner, a RAM for arithmetic processing, and a microprocesser connected to the nonvolatile program memory, the nonvolatile data memory and the RAM. The vehicular electronic control apparatus controls vehicle electric loads on the basis of input signals from vehicle sensors, the control program stored in the nonvolatile program memory, and the variable control data stored in the nonvolatile data memory.

The vehicular electronic control apparatus further includes a reference data storage memory, data memory abnormality judging means for the nonvolatile data memory, and first, second and third transfer means for the RAM.

The reference data storage memory is an electrically writable nonvolatile memory in which reference data corresponding to the parts of the variable control data stored in the first and second data memories are stored. The data memory abnormality judging means is means for the first and second data memories for judging whether the parts of the variable control data stored in the first data memory and those stored in the second data memory are normal or abnormal. The first transfer means is means for transferring and writing the parts of the variable control data from one of the first and second data memories to the RAM if the data memory abnormality judging means judges that the parts of the variable control data stored in the first data memory and those stored in the second data memory are both normal. The second transfer means is means for writing estimated variable control data based on the reference data from the reference data storage memory to the RAM if the data memory abnormality judging means judges that the parts of the variable control data stored in the first data memory and those stored in the second data memory are both abnormal. The third transfer means is means for transferring and writing, if the data memory abnormality judging means judges that one of the parts of the variable control data stored in the first data memory and those stored in the second data memory is abnormal, the parts of the variable control data stored in a normal one of the first and second data memories to the RAM. The microprocessor controls the vehicle electric loads on the basis of one of the variable control data and the estimated variable control data that have been written to the RAM.

This configuration enables a drive of a vehicle by using estimated variable control data that have been written to the RAM even in the case where an abnormality is found in the first and second data memories. Further, variable control data that are important for the safety and vehicle performance can also be stored in the nonvolatile first and second data memories on which rewriting can be performed easily. A more effective vehicle control can be performed by using corrected variable control data by overwriting the data stored in the first and second data memories with control variable data in the RAM that have been corrected and rewritten by the microprocessor.

DESCRIPTION OF THE PREFERRED EMBODIMENTS

First Embodiment (1) Configuration of First Embodiment

A vehicular electronic control apparatus according to a first embodiment of the present invention will be hereinafter described with reference to FIG. 1, which is a block diagram showing its entire configuration.

Figure 1:
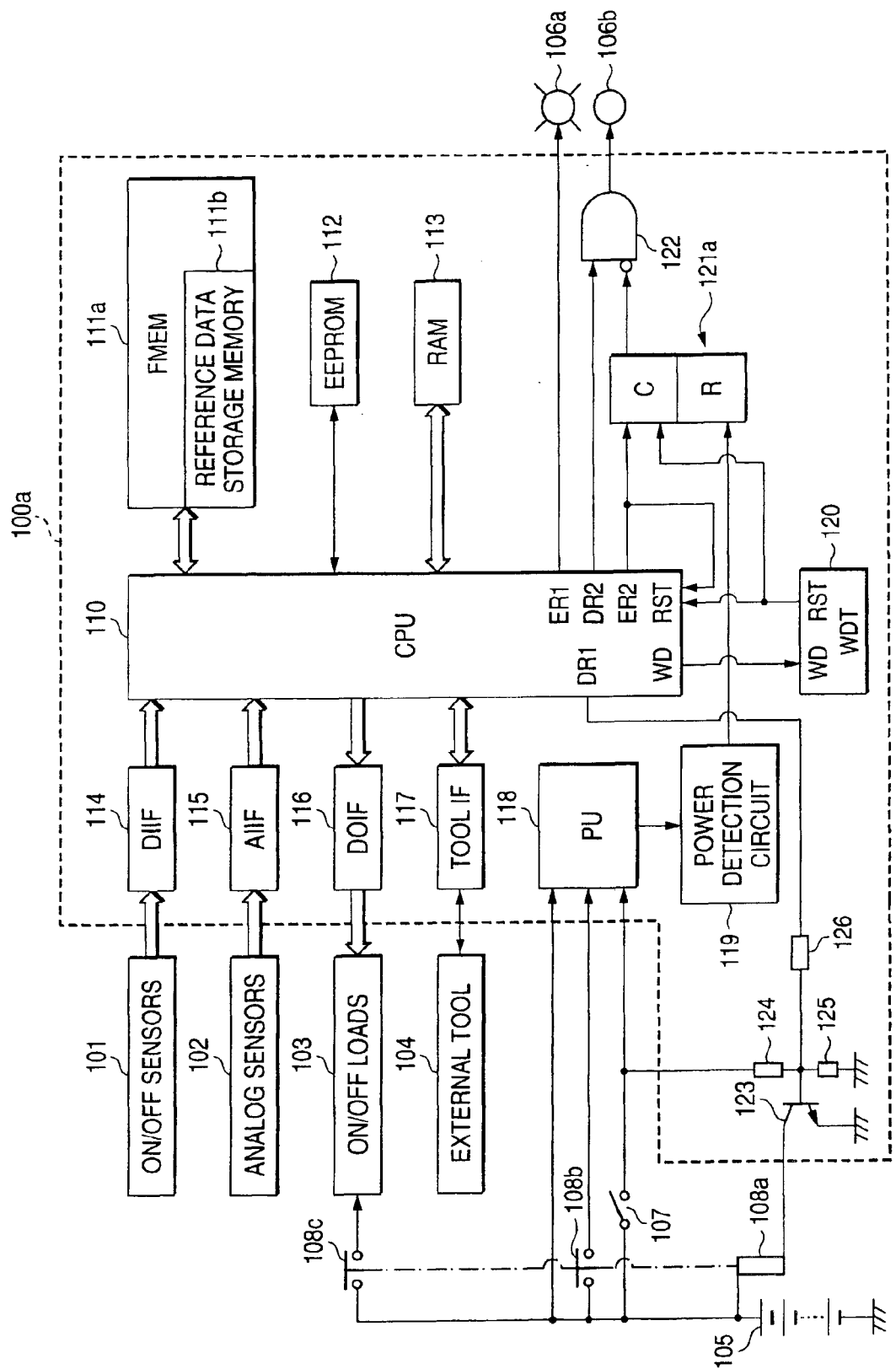
FIG. 1 is a block diagram showing the entire configuration of a vehicular electronic control apparatus according to a first embodiment of the present invention.

In FIG. 1, a broken-line block indicates the vehicular electronic control apparatus 100a according to the first embodiment. The vehicular electronic control apparatus 100a includes external devices shown outside the broken-line block and internal devices shown inside the broken-line block. The internal devices are mounted on a single electronic circuit board and housed in a sealed case.

The external devices of the vehicular electronic control apparatus 100a include on/off-type (i.e., digital-type) vehicle sensors 101, analog-type vehicle sensors 102, on/off-type vehicle electric loads 103, an external tool 104, a vehicle battery 105, an abnormality alarming/display means 106a, a load power relay 106b, a power switch 107, and a power relay 108a.

The on/off-type vehicle sensors 101 include an engine rotation sensor, a crank angle sensor, and a vehicle speed sensor. The analog-type vehicle sensors 102 include an accelerator position sensor, a throttle position sensor, a water temperature sensor, an exhaust gas oxygen concentration sensor, and an airflow sensor. The on/off-type vehicle electric loads 103 include engine ignition coils, fuel injection control electromagnetic valves, and an intake throttle valve opening control motor. At the time of shipment or maintenance/inspection, the external tool 104 is connected to the vehicular electronic control apparatus 100a via a mating/unmating connector (not shown) and is used for transferring and writing control programs and control constants to a nonvolatile program memory 111a (described later) or reading out and inspecting internal states of the vehicular electronic control apparatus 100a.

The load power relay 106b has an output contact (not shown). The power switch 107 is an ignition switch, for example. The power relay 108a has output contacts 108b and 108c. When energized by the vehicle battery 105 in link with a closing operation of the power switch 107, the power relay 108a turns on the output contacts 108b and 108c. The power relay 108a closes a power circuit for the vehicle electric loads 103 by turning on the output contact 108c, and closes a power supply circuit from the vehicle battery 105 to a control power unit 118 of the vehicular electronic control apparatus 100a by turning on the output contact 108b.

In addition to the power switch 107 and the output contact 108b, a direct connection circuit is provided between the vehicle battery 105 and the control power unit 118 of the vehicular electronic control apparatus 100a to supply power to the control power unit 118 even during opening of the power switch 107 (sleep power supply).

A power circuit to part of the vehicle electric loads 103 is closed via the output contact (not shown) of the load power relay 106b.

The internal devices of the vehicular electronic control apparatus 100a include a microprocessor 110, the program memory 111a, a data memory 112, a RAM 113, interface circuits 114, 115, 116, and 117, the control power unit 118, a power detection circuit 119, a watchdog timer 120, a counter (counting means) 121a, and a drive stopping means 122.

The microprocessor 110 is a 32-bit microprocessor, for example. The program memory 111a is a flash memory (nonvolatile memory) which is a large-capacity memory from and to which data of a large number of bytes can electrically be erased and written collectively by the external tool 104.

The data memory 112 is an EEPROM (nonvolatile memory) from and to which information can electrically be erased and written in units of one byte by the microprocessor 110 without the need for using the external tool 104. The data memory 112 is smaller in capacity and higher in price than the above flash memory.

Since the write time of the EEPROM is longer than that of the RAM, it is difficult for the microprocessor 110 to write data to the EEPROM at least during high-speed rotation of the engine. It is necessary for the microprocessor 110 to write data to the EEPROM during low-speed rotation or a stop of the engine.

The RAM 113 is a random access memory and is used for arithmetic processing. The program memory 111a is connected to the microprocessor 100 by a bidirectional bus, the data memory 112 is connected to the microprocessor 110 by a bidirectional serial bus, and the RAM 113 is connected to the microprocessor 110 by a bidirectional bus.

The program memory 111a incorporates a reference data storage memory 111b, which is part of the memory area of the program memory 111a.

The interface circuit 114 is a digital input interface circuit for connecting the on/off-type vehicle sensors 101 and the microprocessor 110 and is composed of a signal voltage level conversion circuit, a noise filter, a data selector, etc. The interface 115 is an analog input interface circuit for connecting the analog-type vehicle sensors 102 and the microprocessor 110 and is composed of a noise filter, a multi-channel AD converter, a data selector, etc. The interface circuit 116 is an output interface circuit for connecting the vehicle electric loads 103 and the microprocessor 110 and is composed of an output latch memory and a power transistor. The interface circuit 117 is a tool interface circuit that is serially connected to the external tool 104. The external tool 104 is connected to the microprocessor 110 by the tool interface circuit 117.

The control power unit 118 is directly supplied with power from the vehicle battery 105, and is also supplied with power from the vehicle battery 105 via the power switch 107 or the output contact 108b of the power relay 108a. The control power unit 118 generates stabilized control power to be used in the vehicular electronic control apparatus 100a.

The power detection circuit 119 detects closure of the power switch 107 and supplies a pulse to the reset input R of the counter (counting means) 121a to thereby initialize the current count of the counter 121a and clear its count output.

The watchdog timer 120 monitors a watchdog signal WD that is a pulse sequence generated by the microprocessor 110, and generates a reset signal RST when the pulse width of the watchdog signal WD has exceeded a prescribed value to thereby re-activate the microprocessor 110.

The counter 121a is a counter having a count input C and a reset input R and generates a count output when the logic level of the count input C has changed from the low level to the high level a prescribed number of times or more. An error signal ER2 generated by the microprocessor 110 and the reset signal RST generated by the watchdog timer 120 are supplied to the count input C of the counter 121a.

The drive stopping means 122 is a logic circuit, specifically, an AND circuit. A logic-inverted signal of the count of the counter 121a and a load power drive signal DR2 of the microprocessor 110 are supplied to the inputs of the AND circuit, and the load power relay 106b is connected to the output of the AND circuit.

The abnormality alarming/display means 106a is driven by an error signal ER1 generated by the microprocessor 110.

The vehicular electronic control apparatus 100a is also provided with an NPN transistor 123 as a drive circuit element and resistors 124, 125, and 126. The collector terminal of the transistor 123 is connected to an energization coil of the power relay 108a. The resistors 124 and 125 are connected to the vehicle battery 105 via the power switch 107. The connecting point of the resistors 124 and 125 is connected to the base terminal of the transistor 123. The resistor 124 is a first drive resistor and turns on the transistor 123 when the power switch 107 is closed. The resistor 125 is a stabilization resistor and is provided between the base terminal and the emitter terminal of the transistor 123. The resistor 126 is a second drive resistor and supplies a drive signal DR1 generated by the microprocessor 110 to the base terminal of the transistor 123. That is, the resistor 126 turns on the transistor 123 using the drive signal DR1. The microprocessor 110 starts operating when the power relay 108a has been energized by closure of the power switch 107. Once the microprocessor 110 has started operating and has generated a drive signal DR1, the power relay 108a is kept energized until the output of the drive signal DR1 is stopped.

Even if the power relay 108a is kept energized, the supply of power to part of the vehicle electric loads that have great influence on the safe running of the vehicle such as the intake throttle valve opening/closing motor can be stopped by de-energizing the load power relay 106b. Even if the load power relay 106b is de-energized, since the power relay 108a is kept energized, a control is made so as to keep active fundamental functions such as a fuel injection control and an engine ignition control to enable an escape drive of the vehicle.

(2) Operation of the First Embodiment

The operation of the vehicular electronic control apparatus 100a according to the first embodiment having the configuration of FIG. 1 will be described below.

Referring to FIG. 1, the microprocessor 110 controls the vehicle electric loads 103 on the basis of the operation states of the on/off-type vehicle sensors 101, the signal levels of the analog-type vehicle sensors 102, and the contents of the program memory 111a, the data memory 112 and the RAM memory 113. Control programs and control variables have been written in advance to the program memory 111a and the data memory 112 from the external tool 104. In addition to the control programs, fixed control constants have been written to the program memory 111a in advance.

First, second, and third data have been written to the data memory 112 in advance, and abnormality history information is written to the data memory 112 in a saving processing step (described later). The first data are control-apparatus-specific data of the vehicular electronic control apparatus 100a. For example, the control-apparatus-specific data are output voltage accuracy of a constant voltage source that is incorporated in the vehicular electronic control apparatus 100a and calibration value data to be used for correcting for part-by-part variations of the conversion accuracy etc. of an AD converter. The control-apparatus-specific data are semi-fixed control variable data that will not vary once stored as initial values at a shipment test stage of each vehicular electronic control apparatus 100a though they vary from one vehicular electronic control apparatus 100a to another.

The second data that are written to the data memory 112 are vehicle-specific data, and the third data are learning storage data.

The vehicle-specific data are vehicle type data to be used for selecting and determining a control specification of the vehicle on which the vehicular electronic control apparatus 100a is mounted and environment data such as characteristic accuracy information of the vehicle sensors that are externally connected to the vehicular electronic control apparatus 100a. The vehicle-specific data are not determined until the vehicular electronic control apparatus 100a is mounted on the vehicle; they are determined in accordance with the vehicle on which the vehicular electronic control apparatus 100a is mounted. The vehicle-specific data are semi-fixed control variable data that are stored in each vehicular electronic control apparatus 100a mounted on one vehicle as initial values in accordance with the vehicle and will not vary once stored as initial values, though the vehicle-specific data are different for vehicular electronic control apparatuses 100a that are mounted on respective vehicles.

The learning storage data that are stored as the third data in the data memory 112 are drive control data that are obtained by actually measuring drive characteristics of the vehicle and variable data relating to characteristic deteriorations of the vehicle sensors and the electric loads. The learning storage data are floating variable control data that are stored as initial values when the vehicle is driven for the first time and are assumed to vary in prescribed ranges as a result of learning that will be performed as the vehicle is driven thereafter. More specifically, initial values of this kind of variable control data have been written in advance from the external tool 104. Variable control data of this kind are automatically acquired by the microprocessor 110 at the time of a shipment test of the control apparatus 100a and its first energization after its mounting on the vehicle as well as during an actual drive of the vehicle, and are saved to the data memory 112 via the RAM 113.

In the first embodiment, reference data have been written in advance to the reference data storage memory 111b of the program memory 111a from the external tool 104. The reference data include upper/lower limit value data for at least one of the above-mentioned control-apparatus-specific data and vehicle-specific data and the above-mentioned learning storage data. The upper/lower limit value data are data such as "12.3 to 14.5," that is, data having an allowable variation range for control variable data. Instead of the upper/lower limit value data, the reference data may include typical values of the control variable data and variation data relating to allowable variation ranges corresponding to the typical values. The typical values and the variation data for the typical values are data such as "13.1 (−0.8 to +1.4)" in which "13.1" is a typical data and "(−0.8 to +1.4)" is allowable variation data for the typical value.

If an abnormality is found in the data stored in the data memory 112, the abnormality alarming/display means 106a starts operating in response to an error signal ER1 (data memory abnormality) that is output from the microprocessor 110. On the other hand, if an abnormality is found in the information stored in the program memory 111a or the reference data storage memory 111b, an error signal ER2 (resetting means) is generated, whereupon the microprocessor 110 is reset and reactivated. The counter 121a counts the number of times of reactivation, and the load power relay 106b is de-energized if the number of times of reactivation has exceeded a prescribed value.

The watchdog timer 120 monitors the watchdog signal WD that is generated by the microprocessor 110. If the pulse width of the watchdog signal WD is abnormal, the watchdog timer 120 resets and reactivates the microprocessor 110 and the counter 121a counts the number of times of reactivation in such a manner that it is added to the number of times of reactivation in response to error signals ER2.

Even if the load power relay 106b is de-energized, the engine fuel injection electromagnetic valves and the ignition coils are kept operational via the contact 108c of the power relay 108a to enable a safe escape drive. In a case that an abnormality as the cause of resetting and reactivation of the microprocessor 110 is simultaneous occurrence of temporary noises, if the power switch 107 is turned off and then turned on, the counter 121a is reset by the power detection circuit 119 and operation of the load power relay 106b is recovered.

The second drive resistor 126 for the transistor 123 serves to stop the supply of power to the vehicular electronic control apparatus 100a after a delay of a prescribed time after opening of the power switch 107. The control variable data and abnormality history data (described data) that are stored in the RAM 113 are saved to the data memory 112 during the delay.

The operation of the vehicular electronic control apparatus 100a according to the first embodiment having the configuration of FIG. 1 will be described with reference to a flow chart of FIG. 2. The flow chart of FIG. 2 shows an abnormality diagnosis operation that is performed by the microprocessor 110 on the program memory 111a, the reference data storage memory 111b, the data memory 112, and the RAM 113 as well as a countermeasure operation against an abnormality that is also performed by the microprocessor 110.

Figure 2:
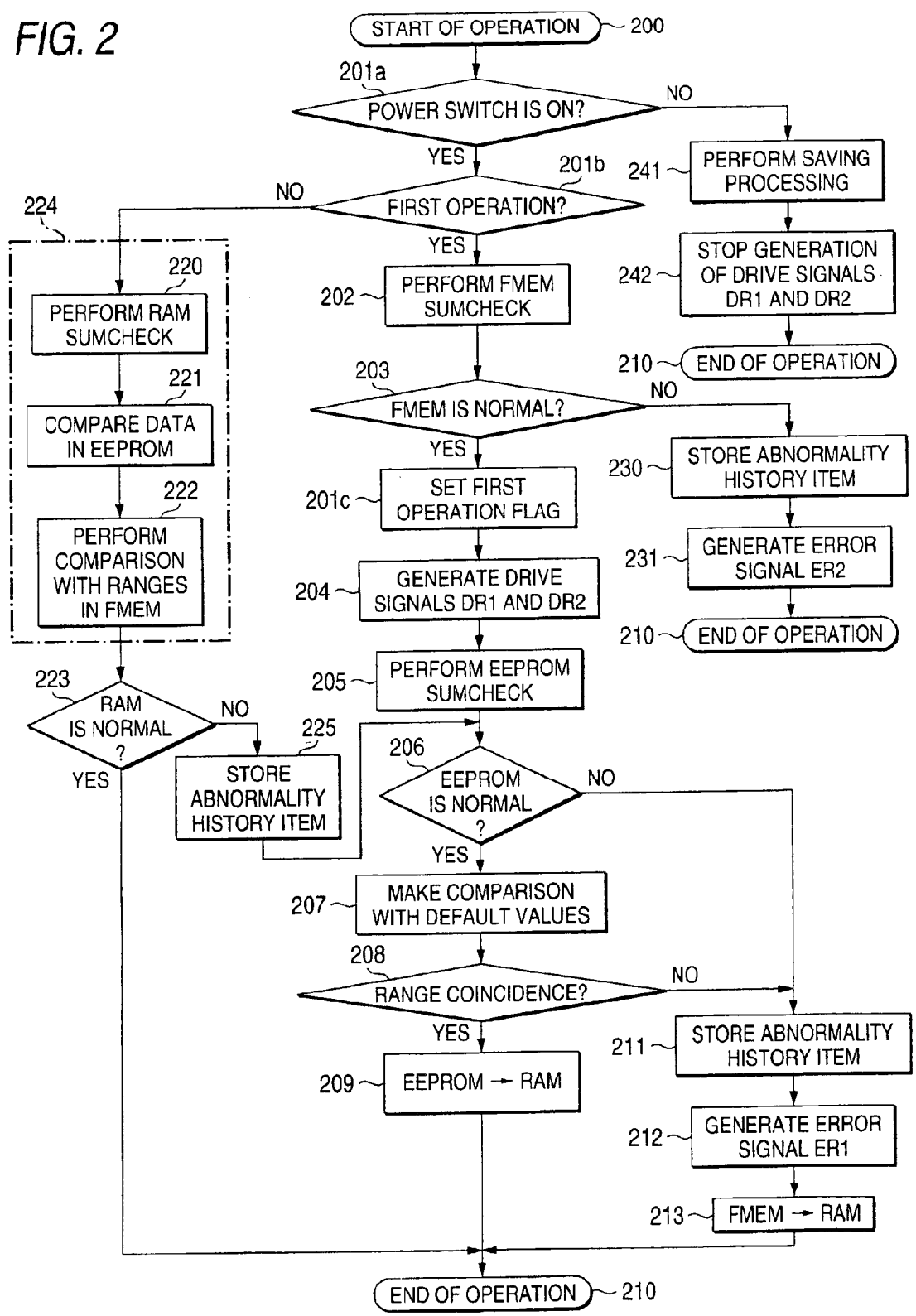
FIG. 2 is a flow chart showing the operation of the vehicular electronic control apparatus of FIG. 1.

In FIG. 2, step 200 is an operation start step of the abnormality diagnosis operation on the memories 111a, 111b, 112, and 113 and the countermeasure operation against an abnormality that are performed by the microprocessor 110. Step 201a, which is executed after step 200, is a judgment step in which it is judged whether the power switch 107 is in an on-state. Step 201b, which is executed if the power switch 107 in an on-state and hence the judgment result of step 201a is "yes," is the first operation judgment step in which it is judged whether the current operation is the first one by judging whether a first operation flag (to be set in the subsequent step 201c) is set. Step 202, which is executed if it is judged at step 201b that the current operation is the first one, is a system abnormality judgment step in which a sumcheck is performed on all the information stored in the program memory 111a including the reference data storage memory 111b to detect a lack and erroneous mixing of bit information, if any, in each piece of information.

The sumcheck at step 202 usually includes a parity check function. Sum data necessary for the sumcheck are stored in the memory 111a and 111b. A parity check may be performed in place of the sumcheck.

Step 203, which is executed after step 202, is a judgment step in which it is judged whether the control programs and the reference data that are stored in the program memory 111a including the reference data storage memory 111b are normal. If the judgment result of step 203 is "yes" (i.e., the information stored in the program memory 111a including the reference data storage memory 111b has no abnormality, that is, no lack and erroneous mixing of bit information), the process goes to step 201c. If the judgment result of step 203 is "no" (i.e., an abnormality was found), the process goes to step 230. Step 201c is a first operation flag setting step. Step 204, which is executed after step 201c, is a drive output step in which the microprocessor 110 generates a power relay drive signal DR1 and a load power relay drive signal DR2. Step 205, which is executed after step 204, is an abnormality detection step for the data memory 112 in which a sumcheck is performed on all data that are stored in the data memory 112 to detect a lack and erroneous mixing of bit information, if any, in those data. The sumcheck at step 205 can also be replaced by a parity check. Sum data that are necessary for the sumcheck are stored in the data memory 112.

Step 206, which is executed after step 205, is a judgment step. If the judgment result of step 206 is "yes" (i.e., the data in the data memory 112 have no abnormality, that is, no lack or erroneous mixing of bit information), the process goes to step 207. If the judgment result is "no" (i.e., an abnormality was found), the process goes to step 211. Step 207 is a range comparison step in which it is judged whether the control variable data stored in the data memory 112 conform to the reference data stored in the reference data storage memory 111b, that is, have values between the upper/lower limit values for the control variable data.

Step 208, which is executed after step 207, is a range coincidence judgment step in which a judgment result "yes" is produced if it is found by the range comparison at step 207 that the control variable data are between the upper/lower limit values. And the process goes to step 209. If an abnormality is found, that is, if there exists control variable data that is not between its upper/lower limit values, a judgment "no" is made and the process goes to step 211. Steps 205, 206, 207, and 208 are a data memory abnormality judgment step for the data memory 112.

Step 209 is a first transfer step in which the data stored in the data memory 112 are transferred (written) to the RAM 113. Step 210, which is executed after step 209, is an operation end step in which the microprocessor 110 performs another control operation. The process then returns to the operation start step 200.

Step 211 is an abnormality history storing step in which the fact that the result of the abnormality detection on the data memory 112 at step 205 was "abnormal" or the result of the range comparison at step 207 was "abnormal" is stored. Step 212, which is executed after step 211, is a step of generating an error signal ER1. Step 213, which is executed after step 212, is a second transfer step in which the reference data stored in the reference data storage memory 111b, that is, average values of the upper/lower limit values for control variable data or typical values of the variable control data, are transferred (written) to the RAM 113 as estimated variable control data. After execution of the second transfer step, the process goes to the operation end step 210.

Step 220, which is executed if it is judged at step 210b that the current operation is not the first one, is a bit information abnormality detection step for the RAM 113 in which a sumcheck is performed on at least a write area to which the variable control data were transferred (written) at step 209 or 213 among the storage areas of the RAM 113 and it is thereby checked whether there exists a lack and erroneous mixing of bit information. The sumcheck at step 220 may be replaced by a parity check. The sum data necessary for the sumcheck are written to the RAM 113, in particular, the write area of the variable control data of the transfer at step 209 or 213.

Step 221, which his executed after step 220, is a coincidence judgment step in which it is checked whether the variable control data stored in the data memory 112 and the RAM 113 coincide with history information data (described later).

Since the variable control data in the RAM 113 and the history information data (described later) are subject to learning corrections and history changes, respectively, the coincidence judgment is not performed if a change flag (not shown) is set. A change flag is reset if saving transfer to the data memory 112 is performed at step 241 (described later).

Step 222, which is executed after step 221, is a range comparison step in which it is judged whether the variable control data that have been transferred (written) to the RAM 113 conform to the reference data stored in the reference data storage memory 111b, that is, have values between the upper/lower limit values for the variable control data. Step 223, which is executed after step 222, is a judgment step in which it is judged whether all the judgment results of steps 220–222 are "normal." If the judgment result of step 223 is "yes," the process goes to the operation end step 210. If any of the judgment results of steps 220–222 is "abnormal," the process goes to step 225. Step 224 is a RAM abnormality judgement step block consisting of steps 220–222. Step 225 is an abnormality history storing step in which the fact that the result of the abnormality judgment on the RAM 113 at step 224 was "abnormal" is stored. After execution of step 225, the process goes to step 206.

Step 230 is an abnormality history storing step for the program memory 111a including the reference data storage memory 111b. At step 230, if the judgment result of each abnormality judgment on the program memory 111a at the system abnormality judgment step 202 is "abnormal," a code number indicating the content of the abnormality is stored together with the number of times of occurrence of abnormalities of the same kind. Step 231, which is executed after step 230, is a step of generating an error signal ER2. The microprocessor 110 is reset and reactivated in response to the error signal ER2. The number of times of generation of error signals ER2 is counted by the counter 121a. After execution of step 231, the process goes to the operation end step 210.

Step 241, which is executed if it is judged at the judgment step 201a that the state of the power switch 107 has changed from "on" to "off," is a saving processing step in which the control variable data as various learning data stored in the RAM 113 and the abnormality history information that was stored at steps 211, 225, and 230 are transferred to and stored in the data memory 112. Step 242, which is executed after step 241, is a step of stopping the generation of the drive signals DR1 and DR2. After execution of step 242, the process goes to the operation end step 210.

The above operation will be summarized below. In the first operation that is performed after turning-on of the power switch 107, an abnormality diagnosis on the program memory 111a including the reference data storage memory 111b is performed at step 202 and an abnormality diagnosis is performed on the data memory 112 at step 205.

If an abnormality is found at step 202 (system abnormality judging means), an error signal ER2 is generated at step 231, whereupon the microprocessor 110 is reset and reactivated and the number of times of occurrence of abnormalities is increased by the counter 121a (see FIG. 1).

At step 230 (abnormality history storing means for the program memory 111a including the reference data storage memory 111b), a code number indicating the content of the abnormality and the number of times of occurrence of abnormalities are stored. An error signal ER2 is generated at step 231, whereupon the microprocessor 110 is reset and reactivated. If the sum of the number of times of occurrence of error signals ER2 and that of reset signals RST of the watchdog timer 120 exceeds a prescribed value, the counter 121a (see FIG. 1)is increases the count and de-energizes the load power relay 106b.

If an abnormality is found at step 205 or step 207 (abnormality judging means for the data memory 112), a code number indicating the content of the abnormality and the number of times of occurrence of abnormalities are stored at step 211 (abnormality history storing means) and an error signal ER1 is generated at step 212, whereupon the abnormality alarming/display means 106a (see FIG. 1) starts operating. At step 213 (second transfer means), estimated control variable data that are average values or typical values of the reference data are written from the reference data storage memory 111b to the RAM 113.

If no abnormality is found at step 205 (abnormality judging means for the data memory 112), it is judged at step 207 (range comparing means) whether the control variable data stored in the data memory 112 fall within the ranges of the reference data stored in the reference data storage memory 111b. If the judgment result is "range non-coincidence," that is, if there exists control variable data that is out of the range of its reference data, an error signal ER1 is generated at step 212, whereupon the abnormality alarming/display means 106a starts operating. At step 213 (second transfer means), the reference data stored in the reference data storage memory 111b, that is, estimated control variable data that are average values of the upper/lower limit values or typical values of the control variable data are written to the RAM 113.

If the judgment result of step 207 (range comparing means) is "normal," the process goes to step 209 (first transfer means), where data including the variable control data in the data memory 112 are transferred (written) to the RAM 113.

After the control variable data have been written to the RAM 113 in the above-described manner, a diagnosis is performed on the RAM 113 on a regular basis in the step block 224 (RAM abnormality detecting means). If an abnormality is found in the variable control data that are stored in the RAM 113, a code number indicating the content of the abnormality and the number of times of occurrence of abnormalities are stored at step 225 (abnormality history storing means). Writing is performed again on the RAM 113 at step 209 or 213 depending on the state of the data memory 112.

If the power switch 107 is turned off, the variable control data that are abnormality history information and various learning data are transferred to and stored in the data memory 112 at step 241 (saving processing means). At the subsequent step 242 (delayed power shutoff means), the generation of the power relay drive signal DR1 and the load power relay drive signal DR2 are stopped.

(3) Advantages of First Embodiment

As described above, the vehicular electronic control apparatus 100a according to the first embodiment is provided with the reference data storage memory 111b, the data memory abnormality judging means 205, 206, 207, and 208 for the nonvolatile data memory 112, and the first transfer means 209 and the second transfer means 213 for the RAM 113. If variable control data stored in the data memory 112 are judged normal by the data memory abnormality judging means 206 and 208, the variable control data are transferred (written) from the data memory 112 to the RAM 113. If the variable control data stored in the data memory 112 are judged abnormal, estimated variable control data that are based on the reference data are written from the reference data storage memory 111b to the RAM 113. This configuration enables a drive of the vehicle by using the estimated variable control data that have been written to the RAM 113 even in the case where an abnormality was found in the data memory 112. Further, variable control data that are important for the safety and vehicle performance can also be stored in the nonvolatile data memory 112 on which rewriting can be performed easily. This makes it possible to correct variable control data in the RAM 113 with a learning means and perform a more effective vehicle control by using corrected variable control data.

In the first embodiment, the program memory 111a and the reference data storage memory 111b are formed by nonvolatile flash memories and the data memory 112 is a nonvolatile EEPROM. Therefore, variable control data can easily be corrected in the data memory 112 and the reference data storage memory 111b can easily be formed by sharing the same flash memory with the program memory 111a.

In the first embodiment, the reference data include upper/lower limit value data for variable control data. A vehicle drive control can be performed safely while a diagnosis is performed as to whether variable control data stored in the data memory 112 and the RAM 113 fall within the ranges of the upper/lower limit value data. Also in the case where the reference data are typical values of variable control data stored in the data memory 112 and the RAM 113 and their variation range data, a vehicle drive control can be performed safely while a diagnosis is performed as to whether variable control data stored in the data memory 112 and the RAM 113 fall within the ranges of the variation range data.

In the first embodiment, control variable data to be stored in the data memory 112 are at least one of control-apparatus-specific data and vehicle-specific data and learning storage data. The control-apparatus-specific data are calibration value data of components of the control apparatus 100a. The vehicle-specific data include at least one of vehicle type data and vehicle sensor environment data. The learning storage data include at least one of drive control data of a vehicle on which the control apparatus 100a is mounted and variation data relating to characteristic deteriorations of vehicle electric loads. Reference data to be stored in the reference data storage memory 111b include one of upper/lower limit value data for the control variable data and typical values of the variable control data and their allowable variation range data. Therefore, the vehicle can be controlled safely with a high degree of freedom while a variety of variable control data are written from the data memory 112 to the RAM 113 and vice versa.

In the first embodiment, the data memory abnormality judging means for the data memory 112 has the bit information lack/erroneous mixing detecting means 205 and range comparing means 207 for comparing variable control data stored in the data memory 112 with reference data stored in the reference data storage memory 111b to check whether the variable control data stored in the data memory 112 fall within the allowable ranges of the reference data. Whether the variable control data stored in the data memory 112 are normal or abnormal is judged by the bit information lack/erroneous mixing detecting means 205 and the range comparing means 207. Therefore, a diagnosis on the variable control data stored in the data memory 112 can be performed reliably from the two sides, that is, a lack and erroneous mixing of bit information and range comparison.

Since the bit information lack/erroneous mixing detecting means 205 performs either a bit sumcheck or a parity check, lack and erroneous mixing of bit information can be detected easily.

In the first embodiment, the RAM abnormality detecting means 224 for the RAM 113 is provided which has the bit information lack/erroneous mixing detecting means 220, the coincidence judging means 221 for judging whether variable control data that have been transferred (written) to the RAM 113 coincide with those stored in the data memory 112, and the range comparing means 222 for reference data. If the RAM abnormality judging means 224 judges that variable control data that have been written to the RAM 113 are abnormal, the data memory abnormality judging means 205, 206, 207, and 208 performs an abnormality judgment on the data memory 112. Transfer and writing to the RAM 113 are performed by the first transfer means 209 or the second transfer means 213 depending on the result of the abnormality judgment. Therefore, if the variable control data that have been written to the RAM 113 are normal, the variable control data are not transferred (written) to the RAM 113 without a reason, whereby the risk that abnormal variable control data are written to the RAM 113 from the data memory 112 where an abnormality has occurred can be lowered.

In the first embodiment, the abnormality alarming/display means 106a is provided which responds to the data memory abnormality judging means 205, 206, 207, and 208 for the data memory 112. The abnormality alarming/display means 106a announces that the microprocessor 110 is controlling the vehicle electric loads 103 on the basis of estimated variable control data that have been written from the reference data storage memory 111b to the RAM 113 by the second transfer means 213. This makes it possible to reliably inform the driver of the occurrence of an abnormality in the data memory 112. There may occur a case that the driver does not realize that an abnormality has occurred in variable control data stored in the data memory 112 and drives the vehicle in a state that the fuel efficiency and the exhaust gas cleaning, for example, are not optimum even if the driving is being performed on the basis of estimated variable control data that have been written to the RAM 113. The abnormality alarming/display means 106a clearly indicates the abnormality in the data memory 112 and can thereby urge the driver to do maintenance or inspection and increase the safety.

In the first embodiment, the abnormality history storing means 211, 225, and 230, the saving processing means 241, and the delayed power shutoff means 242 are provided. The abnormality history storing means 211, 225, and 230 store the fact of occurrence of an abnormality in the data memory 112, the RAM 113, and the program memory 111a including the reference data storage memory 111b, respectively, and its content into the RAM 113. The saving processing means 241 transfers and stores abnormality history information that has been stored in the RAM 113 by the abnormality history storing means 211, 225, and 230 to and into the data memory 112 together with learning-corrected variable control data. The delayed power shutoff means 242 shuts off the power to the control power unit 118 with a delay that is not shorter than a time from opening of the power switch 107 to completion of saving processing by the saving processing means 241. Saving abnormality history information that has been stored in the RAM 113 by the abnormality history storing means 211, 225, and 230 to the data memory 112 together with learning-corrected variable control data at a time point when a vehicle control has completed after opening of the power switch 107 enables storage of the abnormality history information; the abnormality history information can be analyzed in detail by using the external tool 104 even after the vehicular electronic control apparatus 100a is separated from the vehicle battery 105.

In the first embodiment, the system abnormality judging means 202, the resetting means using the error signal ER2, the counting means (counter) 121a, and the drive stopping means 122 are provided. The system abnormality judging means 202 judges whether the system is normal or abnormal by detecting a lack and erroneous mixing of bit information in the program memory 111a including the reference data storage memory 111b. Operating when the system abnormality judging means 202 has judged that the system is abnormal, the resetting means using the error signal ER2 resets the microprocessor 110 temporarily and then reactivates it. The counting means 121a generates a count when the number of times of resetting of the microprocessor 110 by error signals ER2 has exceeded the prescribed value. The counting means 121a is reset at the time of re-closing of the power switch 107. The drive stopping means 122 is a logic circuit that operates when the counting means 121a is generating an increased count and shuts off power to part of the vehicle electric loads 103.

Therefore, when an abnormality occurs in the program memory 111a including the reference data storage memory 111b, the operation of particular loads such as the intake throttle valve opening control motor is stopped by the drive stopping means 122 to secure safety whereas the fundamental functions such as the fuel injection control and the engine ignition control are kept active to enable an escape drive of the vehicle. If the cause of the abnormality is temporary noise, a normal state can be recovered by opening the power switch 107 temporarily and then closing it again.

The watchdog timer 120 is further provided in the first embodiment. The watchdog timer 120 is a timer circuit that generates a reset signal for resetting the microprocessor 110 temporarily and then reactivating it when the pulse width of the watchdog signal generated by the microprocessor 110 is abnormal. The counter 121a also increases the count in response to an output of the watchdog timer 120. Therefore, the safety is increased by an external diagnosis on the microprocessor 110 by the watchdog timer 120.

Second Embodiment

Next, a vehicular electronic control apparatus according to a second embodiment will be described.

(1) Configuration of Second Embodiment

Figure 3:
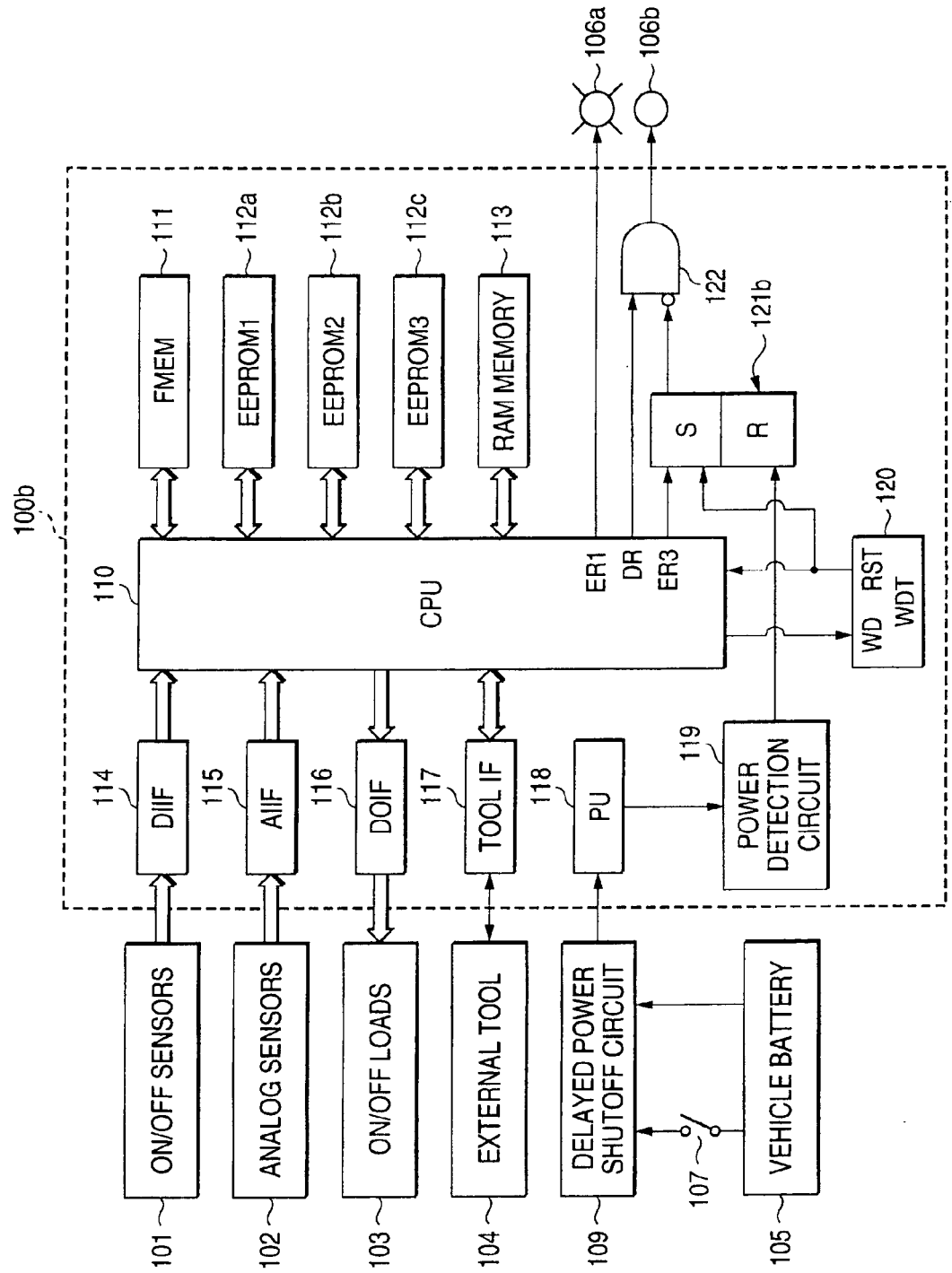
FIG. 3 is a block diagram showing the entire configuration of a vehicular electronic control apparatus according to a second embodiment of the invention.

FIG. 3 is a block diagram showing the entire configuration of the vehicular electronic control apparatus according to the second embodiment. Differences from the vehicular electronic control apparatus 100a of FIG. 1 will be mainly described below with reference to FIG. 3.

In FIG. 3, a broken-line block indicates the vehicular electronic control apparatus 100b according to the second embodiment. The vehicular electronic control apparatus 100b has external devices shown outside the broken-line block and internal devices shown inside the broken-line block. The internal devices are mounted on a single electronic circuit board and housed in a sealed case.

The external devices include on/off-type (i.e., digital-type) vehicle sensors 101, analog-type vehicle sensors 102, on/off-type vehicle electric loads 103, an external tool 104, a vehicle battery 105, an abnormality alarming/display means 106a, a load power relay 106b, a power switch 107, and a delayed power shutoff circuit 109. These external devices are basically the same as shown in FIG. 1 except the delayed power shutoff circuit 109.

The delayed power shutoff circuit 109 immediately starts supplying power to the vehicular electronic control apparatus 100b upon closure of the power switch 107, and stops supplying power to the vehicular electronic control apparatus 100b with a prescribed delay from opening of the power switch 107. The prescribed delay is a time from opening of the power switch 107 to completion of saving processing of a saving processing step 441 (described later).

The internal devices of the vehicular electronic control apparatus 100b include a microprocessor 110, a program memory 111, data memories 112a and 112b, a reference data storage memory 112c, a RAM 113, interface circuits 114, 115, 116, and 117, a control power unit 118, a power detection circuit 119, a watchdog timer 120, an abnormality storage circuit (abnormality storing means) 121b, and a drive stopping circuit (drive stopping means) 122.

Among the above internal devices, the RAM 113, the interface circuits 114, 115, 116, and 117, the control power unit 118, the power detection circuit 119, the watchdog timer 120, and the drive stopping means 122 are the same as shown in FIG. 1.

The microprocessor 110 shown in FIG. 3 generates an error signal ER1, a load power drive signal DR, an error signal ER3, and a watchdog signal WD, and receives a reset signal RST. The connections between the microprocessor 110 and the interface circuits 114, 115, 116, and 117 and the connection between the microprocessor 110 and the watchdog timer 120 are the same as shown in FIG. 1.

Although the program memory 111 shown in FIG. 3 is a flash memory like the program memory 111a shown in FIG. 1 but does not have a reference data storage memory 111b. The data memories 112a and 112b are called a first data memory and a second data memory, respectively. The data memories 112a and 112b and the reference data storage memory 112c are EEPROMs. Each of the program memory 111, the data memories 112a and 112b, the reference data storage memory 112c, and the RAM 113 is connected to the microprocessor 110 by a bidirectional bus.

The abnormality storage circuit (abnormality storing means) 121b is a flip-flop circuit having a set input S and a reset input R. The abnormality storage circuit 121b generates an abnormality storage signal when the logic level at the set input S has changed from a low level (L-level) to a high level (H-level). An error signal ER3 generated by the microprocessor 110 and a reset signal RST generated by the watchdog timer 120 are supplied to the set input S.

A logic-inverted signal of an abnormality storage signal of the abnormality storage circuit 121b and a load power drive signal DR of the microprocessor 110 are supplied to the inputs of the drive stopping circuit (drive stopping means) 122 that is an AND circuit. The load power relay 106b is connected to the output of the drive stopping circuit 122.

The abnormality alarming/display means 106a is driven by an error signal ER1 generated by the microprocessor 110.

(2) Operation of Second Embodiment

The operation of the vehicular electronic control apparatus 100b according to the second embodiment having the configuration of FIG. 3 will be described below.

Referring to FIG. 3, the microprocessor 110 controls the vehicle electric loads 103 on the basis of the operation states of the on/off-type vehicle sensors 101, the signal levels of the analog-type vehicle sensors 102, and the storage contents of the program memory 111, the first data memory 112a, the second data memory 112b, the reference data storage memory 112c, and the RAM 113. Control programs and control variables have been written in advance to the program memory 111, the first data memory 112a, the second data memory 112b, and reference data storage memory 112c from the external tool 104.

In the vehicular electronic control apparatus 100b according to the second embodiment shown in FIG. 3, the same data are written to the first data memory 112a and the second data memory 112b from the external tool 104; the first data memory 112a and the second data memory 112b constitute double-system data memories.

First, second, and third data have been written to each of the first data memory 112a and the second data memory 112b in advance. The first data are control-apparatus-specific data of the vehicular electronic control apparatus 100b. For example, the control-apparatus-specific data are output voltage accuracy of a constant voltage source that is incorporated in the vehicular electronic control apparatus 100b and calibration value data to be used for correcting for part-by-part variations of the conversion accuracy etc. of an AD converter. The control-apparatus-specific data are semi-fixed control variable data that will not vary once stored as initial values at a shipment test stage of each vehicular electronic control apparatus 100b though they vary from one vehicular electronic control apparatus 100b to another.

The second data that are written to the first data memory 112a and the second data memory 112b are vehicle-specific data, and the third data are learning storage data.

The vehicle-specific data are vehicle type data to be used for selecting and determining a control specification of the vehicle on which the vehicular electronic control apparatus 100b is mounted and environment data such as characteristic accuracy information of the vehicle sensors that are externally connected to the vehicular electronic control apparatus 100b. The vehicle-specific data are not determined until the vehicular electronic control apparatus 100b is mounted on the vehicle; they are determined in accordance with the vehicle on which the vehicular electronic control apparatus 100b is mounted. The vehicle-specific data are semi-fixed control variable data that are stored in each vehicular electronic control apparatus 100b mounted on one vehicle as initial values in accordance with the vehicle and will not vary once stored as initial values, though the vehicle-specific data are different for vehicular electronic control apparatuses 100b that are mounted on respective vehicles.

The learning storage data that are stored as the third data in the first data memory 112a and the second data memory 112b are drive control data that are obtained by actually measuring drive characteristics of the vehicle and variable data such as characteristic deterioration information of the vehicle sensors and the electric loads. The learning storage data are floating control variable data that are stored as initial values when the vehicle is driven for the first time and are assumed to vary in prescribed ranges as a result of learning that will be performed as the vehicle is driven thereafter. More specifically, initial values of this kind of variable control data have been written in advance from the external tool 104. Variable control data of this kind are automatically acquired by the microprocessor 110 at the time of a shipment test of the control apparatus 100b and its first energization after its mounting on the vehicle as well as during an actual drive of the vehicle, and are saved to the data memories 112a and 112b via the RAM 113.

In the vehicular electronic control apparatus 100b according to the second embodiment shown in FIG. 3, reference data have been written in advance to the reference data storage memory 112c from the external tool 104. The reference data include at least one of the above-mentioned control-apparatus-specific data and vehicle-specific data and the above-mentioned learning storage data and are upper/lower limit value data for the variable control data. Instead of the upper/lower limit value data, the reference data may include typical values of the variable control data and allowable variation range data corresponding to the typical values.

If an abnormality is found in the storage contents of the first data memory 112a and the second data memory 112b, the abnormality alarming/display means 106a starts operating in response to an error signal ER1. On the other hand, if an abnormality is found in the storage contents of the program memory 111 or the reference data storage memory 112c, an error signal ER3 is generated. The abnormality storage circuit 121b stores the error signal ER3 and de-energizes the load power relay 106b.

The watchdog timer 120 monitors the watchdog signal WD that is generated by the microprocessor 110. If the pulse width of the watchdog signal WD is abnormal, the watchdog timer 120 resets and reactivates the microprocessor 110 by supplying it with a reset signal RST and the abnormality storage circuit 121b stores the reset signal RST and de-energizes the load power relay 106b.

Even if the load power relay 106b is de-energized, the fuel injection electromagnetic valves and the ignition coils of the vehicle are kept operational to enable a safe escape drive. In a case that an abnormality as the cause of de-energization of the load power relay 106b is temporary noise, if the power switch 107 is turned off and then turned on, the abnormality storage circuit 121b is reset by the power detection circuit 119 and operation of the load power relay 106b is recovered.

The operation of the vehicular electronic control apparatus 100b according to the second embodiment having the configuration of FIG. 3 will be described with reference to a flow chart of FIG. 4. The flow chart of FIG. 4 shows an abnormality diagnosis operation that is performed by the microprocessor 110 on the program memory 111, the first data memory 112a, the second data memory 112b, the reference data storage memory 112c, and the RAM 113 as well as a countermeasure operation against an abnormality that is also performed by the microprocessor 110.

Figure 4:
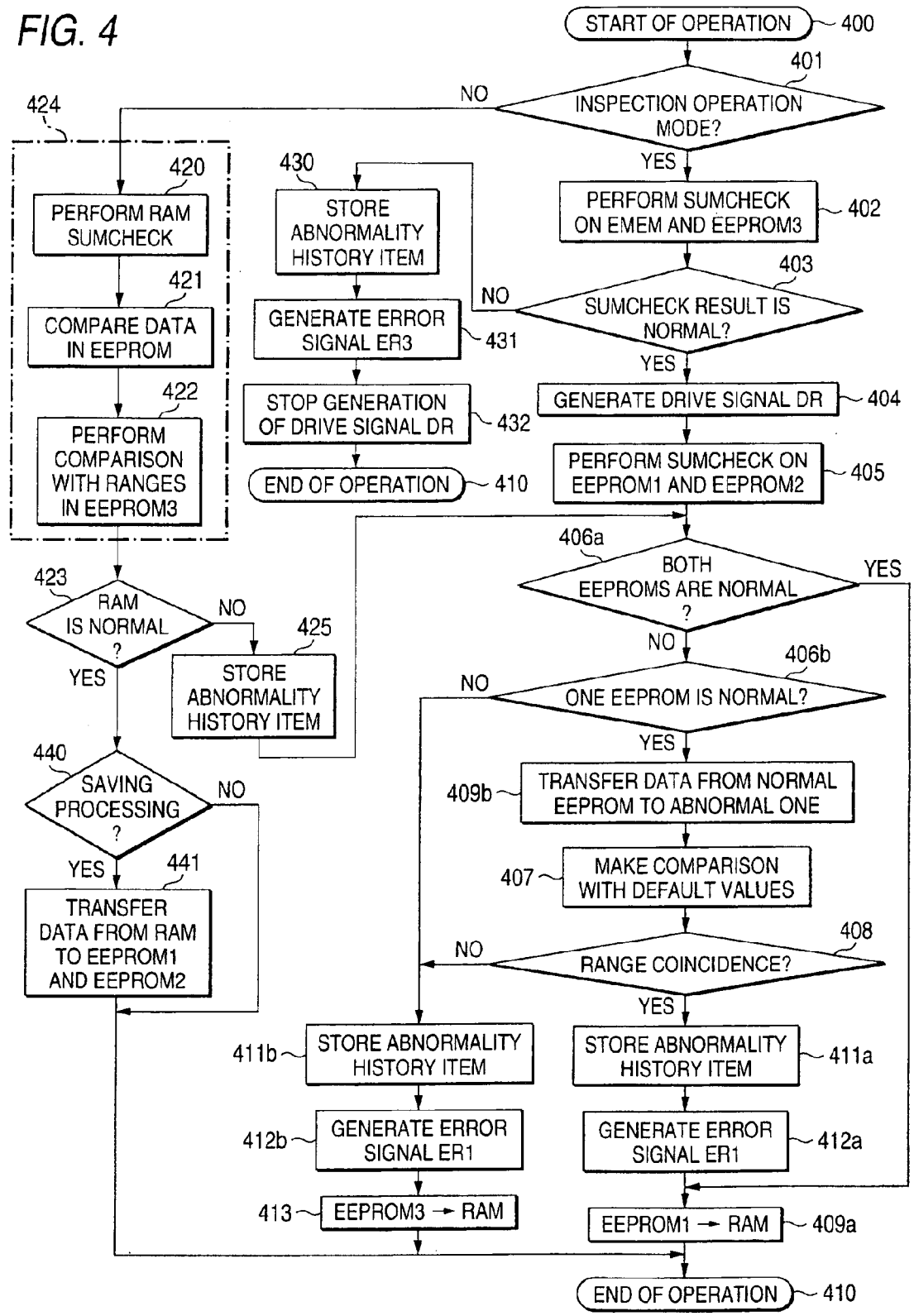
FIG. 4 is a flow chart showing the operation of the vehicular electronic control apparatus of FIG. 3.

In FIG. 4, step 400 is an operation start step of the abnormality diagnosis operation on the memories 111, 112a, 112b, 112c and 113 and the countermeasure operation against an abnormality that are performed by the microprocessor 110. Step 401, which is executed after step 400, is a step of judging whether the current mode is an inspection operation mode. At step 401, a judging means (not shown) usually produces a judgment result "no." Immediately after turning-on of the power or in a state that engine rotation speed is low, the judging means produces a judgment result "yes" on a regular basis.

Step 402, which is executed if the judgment result of the judgment step 402 is "yes," is a system abnormality judgment step in which a sumcheck is performed on all the data stored in the program memory 111 and the reference data storage memory 112c to detect a lack and erroneous mixing of bit information, if any.

Step 403, which is executed after step 402, is a judgment step in which it is judged whether the result of the sumcheck is "normal." If the judgment result of step 403 is "yes" (i.e., no lack and erroneous mixing of bit information was found in the program memory 111 and the reference data storage memory 112c at step 402), the process goes to step 404. If the judgment result of step 403 is "no" (i.e., an abnormality was found), the process goes to step 430. Step 404, which is executed after step 403, is a step in which the microprocessor 110 generates a load power relay drive signal DR. Step 405, which is executed after step 404, is a data memory abnormality judgment step in which a sumcheck is performed on all data that are stored in the first data memory 112a and the second data memory 112b to detect a lack and erroneous mixing of bit information, if any. Step 406a, which is executed after step 405, is a judgment step in which it is judged whether the contents of both of the first data memory 112a and the second data memory 112b are normal and their contents are identical. If the judgment result of step 406a is "yes" (i.e., the data in both of the first data memory 112a and the second data memory 112b have no abnormality, that is, no lack and erroneous mixing of bit information), the process goes to step 409a. If the judgment result of step 406a is "no" (i.e., an abnormality was found), the process goes to step 406b.

Step 406b, which is executed after step 406a, is a judgment step in which it is judged whether one of the first data memory 112a and the second data memory 112b is abnormal. If the judgment result of step 406b is "yes" (i.e., one of the first data memory 112a and the second data memory 112b was judged abnormal as a result of the sumcheck on the first data memory 112a and the second data memory 112b at step 405), the process goes to step 409b. If the judgment result of step 406b is "no" (i.e., both of the first data memory 112a and the second data memory 112b are abnormal or both are normal but their contents do not coincide with each other), branching is made to step 411b. Step 409b, which is executed if step 405 detects that one of the first data memory 112a and the second data memory 112b is abnormal, is a mutual transfer compensation step in which the data are transferred from the normal one of the first data memory 112a and the second data memory 112b to the abnormal one. Step 407, which is executed after step 409b, is a range comparison step in which range comparison is performed on the data stored in the first data memory 112a and the second data memory 112b by using the reference data stored in the reference data storage memory 112c. Specifically, it is judged whether the data stored in the first data memory 112a have values between the upper/lower limit values of the reference data stored in the reference data storage memory 112c. Since the storage data of the first data memory 112a and the second data memory 112b were made identical at the mutual transfer compensation step 409b, this range comparison may be performed between the second data memory 112b and the third data memory 112c.

Step 408, which is executed after step 407, is a judgment step in which it is judged on the basis of the comparison result of the range comparison step 407 whether range coincidence is found, that is, whether the data stored in the first data memory 112a or the second data memory 112b fall within the ranges of the reference data stored in the reference data storage memory 112c. If the judgment result of the judgment step 408 is "yes" (i.e., no abnormality was found in the range comparison), the process goes to step 411a. If the judgment result of the judgment step 408 is "no" (i.e., an abnormality is found), branching is made to step 411b. Step 411a, which is executed if the judgment result of step 408 is "yes," is an abnormality history storing step in which the abnormality history item that one of the first data memory 112a and the second data memory 112b was abnormal (the result of the sumcheck at step 405) and range coincidence was not found is stored. Step 412a, which is executed after step 411a, is a step of generating an error signal ER1. Step 409a, which is executed after step 406a or 412a, is a first/third transfer step in which the data stored in the first data memory 112a are transferred (written) to the RAM 113. Step 410, which is executed after step 409a, is an operation end step in which the microprocessor 110 performs another control operation. The process then returns to the operation start step 400.

Step 411b, which is executed if the judgment result of the judgment step 406b is "no," is an abnormality history storing step in which the abnormal history item that both of the first data memory 112a and the second data memory 112b are abnormal or both are normal but their contents are not identical (the result of the sumcheck on the data stored in the first data memory 112a and the second data memory 112b at step 405), or one of the first data memory 112a and the second data memory 112b is abnormal and a range abnormality is found in the normal one (results of steps 405 and 407) is stored. Step 412b, which is executed after step 411b, is a step of generating an error signal ER1. Step 413, which is executed after step 412b, is a second transfer step in which the reference data stored in the reference data storage memory 111b, that is, average values of or typical values of the reference data stored in the reference data storage memory 112c, are transferred (written) to the RAM 113 as estimated control variable data. After execution of step 413, the process goes to the operation end step 410.

Step 420, which is executed if the judgment result of step 401 is "no" (i.e., the current mode is not the inspection operation mode), is a RAM abnormality detection step in which a sumcheck is performed on at least the variable control data that were transferred (written) at step 409a or 413 among the data stored in the RAM 113 and it is thereby checked whether there exists a lack and erroneous mixing of bit information. Step 421, which is executed after step 420, is a comparison step in which it is checked whether the data stored in the first data memory 112a and the data that were transferred from the first data memory 112a to the RAM 113 coincide with each other. The comparison step 421 is a coincidence judging means.

Since the control variable data in the RAM 113 and history information data (described later) were subjected to learning corrections and history changes, respectively, the coincidence judgment is not performed if a change flag (not shown) is set. A change flag is reset if saving transfer to the data memories 112a and 112b is performed at step 441 (described later).

Step 422, which is executed after step 421, is a range comparison step in which it is judged whether the variable control data stored in the RAM 113 have values between the upper/lower limit values of the reference data stored in the reference data storage memory 112c. Step 423, which is executed after step 422, is a judgment step in which it is judged whether all the judgment results of steps 420–422 are "normal." If the judgment result of step 423 is "yes," the process goes to step 440. If any of the judgment results of steps 420–422 is "abnormal," branching is made to step 425. Step 424 is a RAM abnormality detection step block consisting of steps 420–422. Step 425 is an abnormality history storing step in which the history item that the result of the abnormality judgment on the RAM 113 at step 424 was "abnormal" is stored. After execution of step 425, the process goes to step 406a.

Step 430, which is executed if the judgment result of the abnormality judgment on the program memory 111 and the reference data storage memory 112c at step 402 is "no," is an abnormality history storing step for storing such an abnormality history item. Step 431, which is executed after step 430, is a step of generating an error signal ER3. Step 432, which is executed after step 431, is a step of stopping the generation of the drive signal DR. After execution of step 432, the process goes to the operation end step 410.

Step 440, which is executed if the judgment result of step 423 is "yes," is a saving processing judgment step in which a judgment result "yes" is produced if saving processing should be performed and a judgment result "no" is produced if it need not be performed. Step 441, which is executed if the judgment result of step 440 is "yes" (i.e., saving processing should be performed), is a saving processing step in which the abnormality history information stored in the RAM 113 and learning-corrected variable control data are transferred to and stored in the first data memory 112a and the second data memory 112b. After execution of step 441, the process goes to the operation end step 410. The process also goes to the operation end step 410 if the judgment result of step 440 is "no" (i.e., saving processing need not be performed).

The judgment step 440 is a judging means for causing execution of saving processing once per several hours in the entire operation when, for example, the engine is rotating at a low speed or the power switch 107 has been turned off.

The above operation will be summarized below. In the first operation that is performed after turning-on of the power switch 107 or during low-speed rotation of the engine, an abnormality diagnosis on the program memory 111 and the reference data storage memory 112c is performed at step 402 and an abnormality diagnosis is performed on the first data memory 112a and the second data memory 112b at step 405 on a regular basis.

If an abnormality is found at step 402 (system abnormality judging means), an error signal ER3 is generated at step 431, whereupon the abnormality storage circuit 121b (see FIG. 3) operates to de-energize the load power relay 106b.

At step 430 (abnormality history storing means for the program memory 111 and the reference data storage memory 112c), an abnormality code number indicating the content of an abnormality and the number of times of occurrence of abnormalities are stored every time an abnormality is detected.

If an abnormality is found at step 405 (data memory abnormality judging means for the data memories 112a and 112b), whether both of the first data memory 112a and the second data memory 112b are abnormal or one of them is abnormal is judged at steps 406a, 406b, and 408. A code number indicating the content of the abnormality and the number of times of occurrence of abnormalities are stored at step 411a or 411b (abnormality history storing means) and an error signal ER1 is generated at step 412a or 412b, whereupon the abnormality alarming/display means 106a (see FIG. 3) starts operating. At step 413 (second transfer means), estimated variable control data that are average values or typical values of the reference data are transferred from the reference data storage memory 112c to the RAM 113.

If no abnormality is found at step 405 (data memory abnormality judging means), the process goes to step 409a, where the data stored in the first data memory 112a is transferred (written) to the RAM 113.

If one of the first data memory 112a and the second data memory 112b is abnormal, the abnormal data memory is normalized at step 409b (mutual transfer means). After execution of the mutual transfer, the data stored in the first data memory 112a or the second data memory 112b are compared with the ranges of the reference data stored in the reference data storage memory 112c at step 407 (range comparing means). If the comparison result is "no," both of the first data memory 112a and the second data memory 112b are regarded as abnormal. If the comparison result is "yes," the data stored in the first data memory 112a are transferred (written) to the RAM 113 at step 409a (third transfer means).

After the variable control data or the estimated variable control data have been written to the RAM 113 in the above-described manner, the RAM 113 is diagnosed on a regular basis at the step block 424 (RAM abnormality detecting means). If an abnormality is found in the storage data of the RAM 113 as a result of the diagnosis, its abnormality code number and the number of times of occurrence of abnormalities are stored at step 425 (abnormality history storing means). Writing on the RAM 113 is performed again at step 409a or 413 depending on the states of the first data memory 112a and the second data memory 112b.

At step 441 (saving processing means), various kinds of abnormality history information and various kinds of learning data are transferred to and stored in the first data memory 112a and the second data memory 112b.

(3) Advantages of Second Embodiment

In the vehicular electronic control apparatus 100b according to the second embodiment, the first data memory 112a and the second data memory 112b are provided as nonvolatile data memories and at least part of plural kinds of variable control data are written to the first data memory 112a and the second data memory 112b in a duplicated manner. As such, the first data memory 112a and the second data memory 112b serve as double-system data memories for the duplicated data; the reliability of data can thus be increased.

In the second embodiment, the reference data storage memory 112c, the data memory abnormality judging means 405, 406a, 406b, 407, and 408 for the nonvolatile data memories 112a and 112b, and the first transfer means 409a, the second transfer means 413, and the third transfer means 409a for the RAM 113 are provided. The data memory abnormality judging means 405, 406a, 406b, 407, and 408 judge whether each of plural kinds of variable control data stored in the first data memory 112a and the second data memory 112b is normal or abnormal. The first transfer means 409a is a means for transferring (writing) the control variable data from the first data memory 112a to the RAM 113 if the control variable data stored in the first data memory 112a and the second data memory 112b are both judged normal. The second transfer means 413 is a means for writing estimated variable control data based on the reference data from the reference data storage memory 112c to the RAM 113 if the variable control data stored in the first data memory 112a and the second data memory 112b are both judged abnormal or if the variable control data stored in the first data memory 112a and the second data memory 112b are both judged normal but their contents do not coincide with each other. The third transfer means 409a is a means for writing the control variable data from the normal data memory to the RAM 113 if the variable control data stored in one of the first data memory 112a and the second data memory 112b are judged abnormal. Therefore, the vehicle can be driven by using variable control data or estimated variable control data stored in the RAM 113 in any of the cases that both of the first data memory 112a and the second data memory 112b are normal, both of them are abnormal, and one of them is abnormal.

Further, variable control data that are important for the safety and vehicle performance can also be stored in the nonvolatile data memories 112a and 112b on which rewriting can be performed easily. This makes it possible to correct variable control data in the RAM 113 with a learning means and perform a more effective vehicle control by using corrected variable control data.

In the second embodiment, the program memory 111 is a nonvolatile flash memory and the data memories 112a and 112b and the reference data storage memory 112c are nonvolatile EEPROMs. Therefore, variable control data can easily be corrected in the data memories 112a and 112b and the reference data storage memory 112c can easily be formed by sharing the same EEPROM with the data memories 112a and 112b.

In the second embodiment, reference data are upper/lower limit value data for variable control data stored in the data memories 112a and 112b. A vehicle drive control can be performed safely while a diagnosis is performed as to whether variable control data stored in the data memories 112a and 112b and the RAM 113 fall within the ranges of the upper/lower limit value data. Also in the case where reference data are typical values of variable control data stored in the data memories 112a and 112b and their variation range data, a vehicle drive control can be performed safely while a diagnosis is performed as to whether variable control data stored in the data memories 112a and 112b and the RAM 113 fall within the ranges of the variation range data.

In the second embodiment, variable control data to be stored in the data memories 112a and 112b are at least one of control-apparatus-specific data and vehicle-specific data and learning storage data. The control-apparatus-specific data are calibration value data of components of the control apparatus 100b. The vehicle-specific data include at least one of vehicle type data and vehicle sensor environment data. The learning storage data include at least one of drive control data of a vehicle on which the control apparatus 100b is mounted and variation data relating to characteristic deteriorations of vehicle electric loads. Reference data to be stored in the reference data storage memory 112c include one of upper/lower limit value data for the variable control data and typical values of the variable control data and their allowable variation range data. Therefore, the vehicle can be controlled safely with a high degree of freedom while a variety of variable control data are written from the data memories 112a and 112b to the RAM 113 and vice versa.

In the second embodiment, the data memory abnormality judging means for the data memories 112a and 112b has the bit information lack/erroneous mixing detecting means 405 and range comparing means 407 for comparing variable control data stored in the data memories 112a and 112b with reference data stored in the reference data storage memory 112c to check whether the variable control data stored in the data memories 112a and 112b fall within the allowable ranges of the reference data. Whether the variable control data stored in the data memories 112a and 112b are normal or abnormal is judged by the bit information lack/erroneous mixing detecting means 405 and the range comparing means 407. Therefore, a diagnosis on the variable control data stored in the data memories 112a and 112b can be performed reliably from the two sides, that is, a lack and erroneous mixing of bit information and range comparison.

Since the bit information lack/erroneous mixing detecting means 405 performs either a bit sumcheck or a parity check, a lack and erroneous mixing of bit information can be detected easily.

In the second embodiment, the RAM abnormality detecting means 424 for the RAM 113 is provided which has at least one of the bit information lack/erroneous mixing detecting means 420, the coincidence judging means 421 for judging whether variable control data that have been transferred (written) to the RAM 113 coincide with those stored in the data memories 112a and 112b, and the range comparing means 422 for reference data. If the RAM abnormality detecting means 424 judges that plural kinds of variable control data that have been written to the RAM 113 are abnormal, the data memory abnormality judging means 406a, 406b, 407, and 408 performs an abnormality judgment on the first data memory 112a and the second data memory 112b. Transfer and writing to the RAM 113 are performed by the first transfer means 409a, the second transfer means 413, and the third transfer means 409a depending on the result of the abnormality judgment. Therefore, if the variable control data that have been written to the RAM 113 are normal, the variable control data are not transferred (written) to the RAM 113 without a reason, whereby the risk that abnormal variable control data are written to the RAM 113 from the data memory 112a or 112b where an abnormality has occurred can be lowered.

The mutual transfer means 409b is provided in the second embodiment. The mutual transfer means 409b, which operates if one of the first data memory 112a and the second data memory 112b is abnormal, is a means for transferring (writing) variable control data stored in a normal data memory to an abnormal one. Like the first transfer means 409a, the third transfer means 409a is a means for transferring (writing) variable control data from one of the first data memory 112a and the second data memory 112b to the RAM 113. Therefore, if variable control data stored in one of the first data memory 112a and the second data memory 112b are abnormal, a state that both data memories 112a and 112b are normal is recovered by mutual compensation transfer and the data memories 112a and 112b can continue to operate as double-system data memories. Another advantage is that the first transfer means 409a and the third transfer means 409a can be implemented as a single means and transfer (writing) to the RAM 113 can always be performed from one of the data memories 112a and 112b.

In the second embodiment, the abnormality alarming/display means 106a is provided which responds to the data memory abnormality judging means 405, 406a, 406b, 407, and 408 for the data memories 112a and 112b. The abnormality alarming/display means 106a announces that the microprocessor 110 is controlling the vehicle electric loads 103 on the basis of estimated variable control data that have been transferred (written) from the reference data storage memory 112c to the RAM 113 by the second transfer means 413 or a normal one of the first data memory 112a and the second data memory 112b to the RAM 113 by the third transfer means 409a. This makes it possible to reliably inform the driver of the occurrence of an abnormality in the data memories 112a and 112b. There may occur a case that the driver does not realize that an abnormality has occurred in variable control data stored in the data memories 112a and 112b and drives the vehicle in a state that the fuel efficiency and the exhaust gas cleaning, for example, are not optimum even if the driving is being performed on the basis of estimated variable control data that have been written to the RAM 113. The abnormality alarming/display means 106a clearly indicates the abnormality in the data memories 112a and 112b and can thereby urge the driver to do maintenance or inspection and increase the safety.

In the second embodiment, the abnormality history storing means 411a, 411b, 425, and 230, the saving processing means 441, and the delayed power shutoff means 109 are provided. The abnormality history storing means 411a and 411b store the fact of occurrence of an abnormality in the data memories 112a and 112b and its content into the RAM 113. The abnormality history storing means 425 stores the fact of occurrence of an abnormality in the RAM 113 and its content into the RAM 113. The abnormality history storing means 430 stores the fact of occurrence of an abnormality in the reference data storage memory 112c and the program memory 111 and its content into the RAM 113. The saving processing means 441 transfers and stores abnormality contents that have been stored in the RAM 113 by the abnormality history storing means 411a, 411b, 425, and 430 to and into the data memories 112a and 112b together with learning-corrected variable control data. The delayed power shutoff means 109 shuts off the power to the control power unit 118 with a delay that is not shorter than a time from opening of the power switch 107 to completion of saving processing by the saving processing means 441. Saving abnormality history information that has been stored in the RAM 113 by the abnormality history storing means 411a, 411b, 425, and 430 to the data memories 112a and 112b together with variable control data at a time point when a vehicle control has completed after opening of the power switch 107 enables storage of the abnormality history information; the abnormality history information can be analyzed in detail by using the external tool 104 even after the vehicular electronic control apparatus 100b is separated from the vehicle battery 105.

In the second embodiment, the system abnormality judging means 402, the abnormality storing means 121b, and the drive stopping means 122 are provided. The system abnormality judging means 402 judges whether the system is normal or abnormal by detecting a lack and erroneous mixing of bit information in the reference data storage memory 112c and the program memory 111. The abnormality storing means 121b is an abnormal operation storing circuit that stores the fact that the system abnormality judging means 402 has judged that the system is abnormal, and is reset at the time of re-closing of the power switch 107. The drive stopping means 122 is a logic circuit that operates when the abnormality storing means 121b is storing the fact of occurrence of an abnormality and shuts off power to part of the vehicle electric loads 103. Therefore, when an abnormality occurs in the program memory 111 or the reference data storage memory 112c, the supply of power to particular loads such as the intake throttle valve opening control motor is stopped to secure safety whereas the fundamental functions such as the fuel injection control and the engine ignition control are kept active to enable an escape drive. If the cause of the abnormality is temporary noise, a normal state can be recovered by opening the power switch 107 temporarily and then closing it again.

The watchdog timer 120 is further provided in the second embodiment. The watchdog timer 120 is a timer circuit that generates a reset signal for resetting the microprocessor 110 temporarily and then reactivating it when the pulse width of the watchdog signal generated by the microprocessor 110 is abnormal. The abnormality storing means 121b also stores the fact of occurrence of an abnormality in response to an output of the watchdog timer 120.

Therefore, the safety is increased by an external diagnosis on the microprocessor 110 by the watchdog timer 120.

Other Embodiments

As is apparent from the above description, in the invention, a lack and erroneous mixing of bit information is detected by a sumcheck as the abnormality judging means for the nonvolatile data memory such as an EEPROM to which control variables are written. If an abnormality is detected, replacement control variables in the form of averages or typical values are used on the basis of reference data that have been stored in another nonvolatile memory in advance as backup information. Abnormality information on each memory can be utilized analysis work using the external tool by adding time-of-occurrence information to it.

With the abnormality alarming/display means 106a, it is possible to allow the driver to easily recognize occurrence of an abnormality visually and to recognize its details by also providing an indication lamp and a comment display.

The reference data storage memory may be implemented in various modified forms, an example of which is such that it is implemented as a certain area of the program memory 111a as shown in FIG. 1 and the double-system data memories 112a and 112b are employed as shown in FIG. 3. If one of the double-system data memories 112a and 112b is abnormal, data may be transferred (written) to the RAM for arithmetic processing from one of them after both are rendered normal by mutual transfer. Alternatively, data may be transferred (written) directly to the RAM for arithmetic processing from a normal data memory.

However, if one of the double-system data memories 112a and 112b cannot be normalized even by mutual transfer because it is damaged, it is necessary to directly transfer the storage data of the normal data memory to the RAM.

In an abnormal case that the results of a sumcheck and range comparison on the data memories 112a and 112b are "normal" but their contents do not coincide with each other, average values of their contents may be written to the RAM 113 as estimated variable control data.

As described above, the vehicle electronic control apparatus according to the invention makes it possible to drive a vehicle even at the occurrence of an abnormality in the data memory by writing estimated variable control data to the RAM on the basis of reference data stored in the reference data storage memory. Variable control data that are important for safety and vehicle performance can be stored in the nonvolatile data memory on which rewriting can be performed easily. Further, by correcting variable control data in the RAM with the learning means and transferring corrected variable control data to the data memory, a safe and more effective vehicle control can be performed on the basis of the corrected variable control data.

What is claimed is:

1. A vehicular electronic control apparatus comprising a nonvolatile program memory in which at least a control program suitable for a vehicle to be controlled is stored, a nonvolatile data memory in which at least variable control data are stored, a RAM for arithmetic processing, and a microprocessor connected to the nonvolatile program memory, the nonvolatile data memory and the RAM, for controlling vehicle electric loads on the basis of input signals from vehicle sensors, the control program stored in the nonvolatile program memory, and the variable control data stored in the nonvolatile data memory, the vehicular electronic control apparatus further comprising a reference data storage memory, data memory abnormality judgment means for the nonvolatile data memory, and a first and second transfer means for the RAM, wherein the reference data storage memory comprises an electrically writable nonvolatile memory in which reference data corresponding to the variable control data stored in the nonvolatile data memory are stored, the data memory abnormality judging means is constructed to judge whether the variable control data stored in the nonvolatile data memory are normal or abnormal;

the first transfer means comprises means for transferring and writing the variable control data from the nonvolatile data memory to the RAM if the data memory abnormality judging means judges that the variable control data stored in the nonvolatile data memory are normal, the second transfer means comprises means for writing estimated variable control data based on the reference data from the reference data storage memory to the RAM if the data memory abnormality judging means judges that the variable control data stored in the nonvolatile data memory are abnormal, and the microprocessor controls the vehicle electric loads on the basis of one of the variable control data and the estimated variable control data that have been written to the RAM.

2. A vehicular electronic control apparatus comprising a nonvolatile program memory in which at least a control program suitable for a vehicle to be controlled is stored, a nonvolatile data memory in which at least variable control data are stored, the nonvolatile data memory including first and second data memories in which at least parts of the variable control data are stored in a duplicated manner, a RAM for arithmetic processing, and a microprocessor connected to the nonvolatile program memory, the nonvolatile data memory and the RAM, for controlling vehicle electric loads on the basis of input signals from vehicle sensors, the control program stored in the nonvolatile program memory, and the variable control data stored in the nonvolatile data memory, the vehicular electronic control apparatus further comprising a reference data storage memory, data memory abnormality judging means for the nonvolatile data memory, and first, second and third transfer means for the RAM, wherein the reference data storage memory comprises an electrically writable nonvolatile memory in which reference data corresponding to the parts of the variable control data stored in the first and second data memories are stored, the data memory abnormality judging means comprises means for the first and second data memories for judging whether the parts of the variable control data stored in the first data memory and those stored in the second data memory are normal or abnormal, the first transfer means comprises means for transferring and writing the parts of the variable control data from one of the first and second data memories to the RAM if the data memory abnormality judging means judges that the parts of the variable control data stored in the first data memory and those stored in the second data memory are both normal, the second transfer means comprises means for writing estimated variable control data based on the reference data from the reference data storage memory to the RAM if the data memory abnormality judging means judges that the parts of the variable control data stored in the first data memory and those stored in the second data memory are both abnormal, the third transfer means comprises means for transferring and writing, if the data memory abnormality judging means judges that one of the parts of the variable control data stored in the first data memory and those stored in the second data memory is abnormal, the parts of the variable control data stored in a normal one of the first and second data memories to the RAM, and the microprocessor controls the vehicle electric loads on the basis of one of the variable control data and the estimated variable control data that have been written to the RAM.

3. The vehicular electronic control apparatus according to claim 1 or 2, wherein the nonvolatile program memory and the reference data storage memory comprise nonvolatile flash memories and the nonvolatile data memory comprises a nonvolatile EEPROM.

4. The vehicular electronic control apparatus according to claim 2, wherein the nonvolatile program memory comprises a nonvolatile flash memory, and the first and second data memories and the reference data storage memory are nonvolatile EEPROMs.

5. The vehicular electronic control apparatus according to claim 1 or 2, wherein the reference data include upper and lower limit value data of the variable control data stored in the nonvolatile data memory, and the estimated variable control data are average values of the upper and lower limit value data.

6. The vehicular electronic control apparatus according to claim 1 or 2, wherein the reference data include typical values of the variable control data stored in the nonvolatile data memory and allowable range data relating to allowable variation ranges for the typical values, and the estimated control variable data are the typical values.

7. The vehicular electronic control apparatus according to claim 1 or 2, wherein:
the variable control data stored in the nonvolatile data memory include learning data and at least one of control-apparatus-specific data and vehicle-specific data;
the control-apparatus-specific data are calibration value data to be used for correcting for variations of parts constituting the vehicular electronic control apparatus and are control constants that do not vary once stored as initial values;
the vehicle-specific data include at least one of vehicle type data to be used for selecting and determining a control specification of the vehicle to be controlled and environment data of the vehicle sensors that are externally connected to the vehicular electronic control apparatus, and are control constants that do not vary once stored as initial values;
the learning data include at least one of drive control data obtained by actually measuring drive characteristics of the vehicle to be controlled and variation data relating to characteristic deteriorations of the vehicle sensors and the vehicle electric loads, and are variable control data that are expected to vary in prescribed ranges after being stored as initial values at a start of a drive; and
the reference data stored in the reference data storage memory are reference data corresponding to the learning data and the at least one of the control-apparatus-specific data and the vehicle-specific data, and each of the reference data includes one of an upper and lower value data and a typical value and allowable variation range data of the typical value.

8. The vehicular electronic control apparatus according to claim 1 or 2, wherein the data memory abnormality judging means includes bit information lack and erroneous mixing detecting means for the nonvolatile data memory and range comparing means for judging whether the variable control data stored in the nonvolatile data memory fall within allowable ranges of the reference data stored in the reference data storage memory by comparing the variable control data with the reference data, and the bit information lack and erroneous mixing detecting means and the range comparing means judge whether the variable control data stored in the nonvolatile data memory are normal or abnormal.

9. The vehicular electronic control apparatus according to claim 8, wherein the bit information lack and erroneous mixing detecting means performs one of a sumcheck and a parity check.

10. The vehicular electronic control apparatus according to claim 1, further comprising saving processing means and RAM abnormality judging means for the RAM,
wherein the saving processing means is data storing means for transferring, at a prescribed period or at prescribed time points, the variable control data in the RAM that are rewritten by the microprocessor to the data memory so as to overwrite the data stored therein;
the RAM abnormality judging means includes at least one of bit information lack and erroneous mixing detecting means for the RAM, coincidence judging means for judging whether variable control data that have not been rewritten among the variable control data that have been transferred and written from the nonvolatile data memory to the RAM by the first transfer means with the variable control data that are already stored in the nonvolatile data memory, and range comparing means for comparison with the reference data, and
the data memory abnormality judging means makes a judgment if the RAM abnormality judging means judges that the data that have been written to the RAM are abnormal, and one of the first and second transfer means performs transfer and writing on the RAM depending on a result of the judgment.

11. The vehicular electronic control apparatus according to claim 1 or 10, further comprising abnormality alarming and display means responsive to the data memory abnormality judging means,
wherein the abnormality alarming and display means comprises means for notifying that the microprocessor is controlling the vehicle electric loads using the estimated variable control data that have been written to the RAM from the reference data storage memory by the second transfer means.

12. The vehicular electronic control apparatus according to claim 10, further comprising abnormality history storing means, saving processing means, and delayed power shutoff means,
wherein the abnormality history storing means comprises a means for storing, in itself, a fact of occurrence of an abnormality in at least one of the nonvolatile data memory, the RAM, the nonvolatile program memory, and the reference data storage memory and a content of the abnormality, and for storing the fact and the content in the RAM,
the saving processing means comprises means for transferring the fact of occurrence of the abnormality and the content of the abnormality that have been stored in the RAM by the abnormality history storing means to the data memory together with the variable control data; and
the delayed power shutoff means comprises a power circuit for shutting off control power with a delay that is not shorter than a time from opening of a power switch to completion of saving processing by the saving processing means.

13. The vehicular electronic control apparatus according to claim 2, further comprising saving processing means and RAM abnormality judging means for the RAM,
wherein the saving processing means is data storing means for transferring, at a prescribed period or at prescribed time points, the variable control data in the RAM that are rewritten by the microprocessor to the nonvolatile data memory so as to overwrite the data stored therein; and the RAM abnormality judging means includes at least one of bit information lack and erroneous mixing detecting means for the RAM, coincidence judging means for judging whether the variable control data that have been transferred and written to the RAM by one of the first and third transfer means with the parts of the variable control data that have been written to the first data memory and those that have been written to the second data memory, and range comparing means for comparison with each of the reference data, and the data memory abnormality judging means makes a judgment on the first and second data memories if the RAM abnormality judging means judges that the variable control data that have been written to the RAM are abnormal, and one of the first, second and third transfer means performs transfer and writing on the RAM depending on a result of the judgment.

14. The vehicular electronic control apparatus according to claim 2 or 13, further comprising mutual transfer means, wherein the mutual transfer means comprises means for transferring and writing, if one of the first and second data memories is abnormal, the variable control data stored in a normal one of the first and second data memories to an abnormal one, and the third transfer means transfers and writes the variable control data from one of the first and second data memories to the RAM.

15. The vehicular electronic control apparatus according to claim 2, further comprising abnormality alarming and display means responsive to the data memory abnormality judging means, wherein the abnormality alarming and display means notifies that the microprocessor is controlling the vehicle electric loads using at least one of the estimated variable control data that have been written to the RAM by the second transfer means and the variable control data that have been transferred and written to the RAM by the third transfer means.

16. The vehicular electronic control apparatus according to claim 13, further comprising abnormality history storing means, saving processing means and delayed power shutoff means, wherein the abnormality history storing means comprises means for storing, in itself, a fact of occurrence of an abnormality in at least one of the first and second data memories, the RAM, the nonvolatile program memory, and the reference data storage memory and a content of the abnormality, and for storing the fact and the content in the RAM;

the saving processing means comprises means for transferring the content of the abnormality that has been stored in the RAM by the abnormality history storing means to the first and second data memories together with the variable control data; and the delayed power shutoff means is a power circuit for shutting off control power with a delay that is not shorter than a time from opening of a power switch to completion of saving processing by the saving processing means.

17. The vehicular electronic control apparatus according to claim 1 or 2, further comprising system abnormality judging means, abnormality operation storing means and drive stopping means, wherein the system abnormality judging means includes bit information lack and erroneous mixing detecting means for the nonvolatile program memory and the reference data storage memory to thereby judge whether the system is normal or abnormal, the abnormality operation storing means is an abnormality operation storing circuit for storing a fact that the system abnormality judging means produced a judgment result of abnormality, the abnormality operation storing circuit being reset when a power switch is closed, and the drive stopping means is a logic circuit for stopping a load power relay from supplying drive power to at least part of the vehicle electric loads when the abnormality operation storing circuit stores the fact of occurrence of the abnormality.

18. The vehicular electronic control apparatus according to claim 17, further comprising a watchdog timer, wherein the watchdog timer is a timer circuit for generating a reset signal for temporarily resetting the microprocessor and then reactivating the microprocessor if a watchdog signal generated by the microprocessor has an abnormal pulse width, and the abnormality storing means performs an abnormality storing operation also in response to the reset signal generated by the timer circuit.

19. The vehicular electronic control apparatus according to claim 1 or 2, further comprising system abnormality judging means, resetting means counting means and drive stopping means, wherein the system abnormality judging means includes bit information lack and erroneous mixing detecting means for the nonvolatile program memory and the reference data storage memory to thereby judge whether the system is normal or abnormal, the resetting means comprises means for temporarily resetting the microprocessor and then reactivating the microprocessor if the system abnormality judging means produces a judgment result to the effect that the system is abnormal, the counting means comprises a counter circuit for generating a count when the number of times of resetting of the microprocessor by the resetting means has exceeded a prescribed value, the counter circuit being reset when a power switch is closed; and the drive stopping means comprises a logic circuit for stopping a load power relay from supplying drive power to at least part of the vehicle electric loads when the counter circuit is generates said count.

20. The vehicular electronic control apparatus according to claim 19, further comprising a watchdog timer, wherein the watchdog timer is a timer circuit for generating a reset signal for temporarily resetting the microprocessor and then reactivating the microprocessor if a watchdog signal generated by the microprocessor has an abnormal pulse width, wherein the counting means performs an abnormality counting operation also in response to the reset signal generated by the timer circuit.

* * * * *